(12) United States Patent
Gleason et al.

(10) Patent No.: US 12,462,990 B2
(45) Date of Patent: Nov. 4, 2025

(54) SAFETY SWITCH FOR A BATTERY PACK POWERED TROWEL

(71) Applicant: Milwaukee Electric Tool Corporation, Brookfield, WI (US)

(72) Inventors: Brennen M. Gleason, Milwaukee, WI (US); Caleb R. Hendryx, Waukesha, WI (US); Michael C. Reed, Milwaukee, WI (US); Julio C. Armendariz, Durango (MX)

(73) Assignee: Milwaukee Electric Tool Corporation, Brookfield, WI (US)

( * ) Notice: Subject to any disclaimer, the term of this patent is extended or adjusted under 35 U.S.C. 154(b) by 163 days.

(21) Appl. No.: 18/482,988

(22) Filed: Oct. 9, 2023

(65) Prior Publication Data
US 2024/0120158 A1   Apr. 11, 2024

Related U.S. Application Data

(60) Provisional application No. 63/480,120, filed on Jan. 17, 2023, provisional application No. 63/414,671, filed on Oct. 10, 2022.

(51) Int. Cl.
*H01H 9/06* (2006.01)
*E04F 21/24* (2006.01)
(Continued)

(52) U.S. Cl.
CPC ............. *H01H 9/06* (2013.01); *E04F 21/248* (2013.01); *H01H 21/10* (2013.01);
(Continued)

(58) Field of Classification Search
CPC .. H01H 9/06; H01H 3/36; H01H 3/20; H01H 9/063; H01H 2231/048; H01H 13/14;
(Continued)

(56) References Cited

U.S. PATENT DOCUMENTS

| 3,331,290 A | 7/1967 | Harding, Jr. |
| 4,232,980 A | 11/1980 | Tertinek |

(Continued)

FOREIGN PATENT DOCUMENTS

| CN | 209703963 U | 11/2019 |
| CN | 110670453 A | 1/2020 |

(Continued)

OTHER PUBLICATIONS

Extended European Search Report for Application No. 23202259.0 dated Mar. 13, 2024 (10 pages).

*Primary Examiner* — Ahmed M Saeed
(74) *Attorney, Agent, or Firm* — Michael Best & Friedrich LLP

(57) ABSTRACT

Systems and methods for controlling a power trowel. A power trowel includes a handle including a speed control input, a housing, a shaft connecting the handle and the housing, a safety mechanism located on the shaft, a blade assembly positioned below the housing, a motor located within the motor housing and coupled to the blade assembly, and a controller. The safety mechanism includes a safety lever configured to move in response to an uncontrolled condition of the power trowel. The controller is connected to the motor and the safety mechanism. The controller is configured to drive, in response to actuation of the speed control input, the motor, detect a movement of the safety lever from a first position to a second position, and perform, in response to the movement of the safety lever to the second position, a safety operation.

20 Claims, 13 Drawing Sheets

(51) Int. Cl.
*H01H 21/10* (2006.01)
*H01M 50/247* (2021.01)
*H02K 11/33* (2016.01)

(52) U.S. Cl.
CPC .......... *H01M 50/247* (2021.01); *H02K 11/33* (2016.01); *H01H 2009/065* (2013.01); *H01H 2009/068* (2013.01)

(58) Field of Classification Search
CPC ....... H01H 2009/065; H01H 2300/026; H01H 21/10; H01H 2009/068; E04F 21/248; E01C 19/42; H01M 50/247; H02K 11/33
See application file for complete search history.

(56) References Cited

U.S. PATENT DOCUMENTS

| | | |
|---|---|---|
| 5,372,452 A | 12/1994 | Hodgson |
| 5,632,570 A | 5/1997 | Balling |
| 5,803,657 A | 9/1998 | Hodgson |
| 10,842,337 B2 * | 11/2020 | Persson ................ B24B 7/18 |
| 10,968,574 B2 | 4/2021 | Mikowychok |
| 2007/0006840 A1 | 1/2007 | Hedlund |
| 2008/0193216 A1 * | 8/2008 | Rose ................ E04F 21/248 404/112 |
| 2018/0051472 A1 * | 2/2018 | Grinwald ............ E04F 21/248 |
| 2021/0143709 A1 | 5/2021 | Sprague et al. |
| 2022/0290448 A1 | 9/2022 | Reed et al. |
| 2023/0073356 A1 * | 3/2023 | Yamaoka ............... A01D 34/67 |
| 2023/0189704 A1 * | 6/2023 | Feng ................ A01D 75/20 56/229 |

FOREIGN PATENT DOCUMENTS

| | | |
|---|---|---|
| CN | 110820484 A | 2/2020 |
| CN | 210946404 U | 7/2020 |
| CN | 211037857 U | 7/2020 |
| CN | 211079838 U | 7/2020 |
| CN | 211278916 U | 8/2020 |
| EP | 2789766 A1 | 10/2014 |
| WO | 2021158690 A1 | 8/2021 |

* cited by examiner

SAFETY SWITCH FOR A BATTERY PACK POWERED TROWEL

RELATED APPLICATIONS

This application claims the benefit of U.S. Provisional Patent Application No. 63/480,120, filed Jan. 17, 2023, and U.S. Provisional Patent Application No. 63/414,671, filed Oct. 10, 2022, the entire content of each of which is hereby incorporated by reference.

SUMMARY

Embodiments described herein provide systems and methods for handling an uncontrolled trowel event using a safety switch. For example, a power trowel includes a safety switch located on a shaft of the power trowel. The shaft connects, for example, the motor housing of the power trowel with a handle. The power trowel may begin to spin rapidly or be generally uncontrolled by an operator. In such an event, rotational motion causes the actuation of the safety switch. In response to the actuation of the safety switch, a controller shuts down operation of the motor.

Power trowels described herein include a handle including a speed control input, a housing, a shaft connecting the handle and the housing, a safety mechanism located on the shaft, a blade assembly positioned below the housing, a motor located within the housing and coupled to the blade assembly, and a controller connected to the motor, the speed control input, and the safety mechanism. The safety mechanism includes a safety lever configured to move in response to an uncontrolled condition of the power trowel. The controller is configured to drive, in response to actuation of the speed control input, the motor, detect movement of the safety lever from a first position to a second position, and perform, in response to movement of the safety lever to the second position, a safety operation.

In some aspects, the controller is located within the housing.

In some aspects, the safety mechanism further includes a position sensor configured to detect a position of the safety lever.

In some aspects, the controller is configured to detect the movement of the safety lever based on a signal from the position sensor.

In some aspects, the power trowel includes a power switch located on the handle. The controller is configured to drive, in response to actuation of the speed control input, the motor when the power switch is in a first power switch position, and ignore actuation of the speed control input when the power switch is in a second power switch position.

In some aspects, an amount of power provided to the motor to drive the motor is based on an amount of actuation of the speed control input.

In some aspects, the speed control input includes a lever portion configured to actuate a plunger switch.

In some aspects, the power trowel includes a battery pack interface configured to receive a battery pack, the battery pack interface configured to provide power to the motor. The controller is configured to perform the safety operation by disconnecting the battery pack from the motor.

In some aspects, the controller is configured to perform the safety operation by braking the motor.

In some aspects, the controller is configured to detect a second movement of the safety lever from the second position to the first position and stop, in response to the safety lever being in the first position, performing the safety operation.

Power trowels described herein include a handle including a speed control input, a housing, a shaft connecting the handle and the housing, a blade assembly positioned below the housing, a motor located within the housing and coupled to the blade assembly, and a safety mechanism located on the shaft. The safety mechanism includes a safety lever configured to move from a first position to a second position in response to an uncontrolled condition of the power trowel, a sensor configured to sense whether the safety lever is in the first position or the second position, and a retaining portion configured to retain the safety lever in the second position.

In some aspects, the speed control input includes a lever portion configured to actuate a switch.

In some aspects, the speed control input includes a compression spring configured to maintain a position of the lever portion.

In some aspects, the power trowel further includes a battery pack interface configured to receive a battery pack, the battery pack interface configured to provide power to the motor.

Power trowels described herein include a handle, a housing, a shaft connecting the handle and the housing, a safety mechanism located on the shaft, a motor located within the housing, and a controller connected to the motor and the safety mechanism. The safety mechanism includes a safety lever configured to move in response to an uncontrolled condition of the power trowel. The controller is configured to detect a first movement of the safety lever from a first position to a second position and lock, in response to the first movement of the safety switch to the second position, operation of the motor. The controller is also configured to detect a second movement of the safety lever from the second position to the first position and permit, in response to the second movement of the safety lever to the first position, operation of the motor.

In some aspects, the safety mechanism further includes a position sensor configured to detect a position of the safety lever.

In some aspects, the position sensor includes a microswitch configured to provide an output to the controller in response to the safety lever contacting the microswitch.

In some aspects, the safety mechanism further includes a retaining portion configured to retain the safety lever in the second position.

In some aspects, the retaining portion includes a magnet configured to magnetically attract the safety lever.

In some aspects, the power trowel further includes a battery pack interface configured to receive a battery pack, the battery pack interface configured to provide power to the motor. The controller is further configured to lock operation of the motor by disconnecting the battery pack from the motor.

Power trowels described herein include a handle including a speed control input, a safety mechanism located on the handle, a housing, a shaft connecting the handle and the housing, a blade assembly positioned below the housing, a motor located within the housing and coupled to the blade assembly, and a controller connected to the motor, the speed control input, and the safety mechanism. The safety mechanism includes a safety lever configured to indicate an uncontrolled condition of the power trowel. The controller is configured to drive, in response to actuation of the speed control input, the motor, detect movement of the safety lever from a first position to a second position, and perform, in response to movement of the safety lever to the second position, a safety operation.

In some aspects, the first position is an actuated position, and the second position is a released position.

In some aspects, the controller is further configured to drive the motor in response to actuation of both the speed control input and the safety lever.

In some aspects, the safety mechanism includes a torsion spring configured to provide a resistive force to the safety lever.

In some aspects, the safety mechanism includes at least one switch configured to be actuated by the safety lever, and the safety lever is configured to actuate the at least one switch when the safety lever is in the first position.

Before any embodiments are explained in detail, it is to be understood that the embodiments are not limited in application to the details of the configurations and arrangements of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Accordingly, in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

Other features and aspects will become apparent by consideration of the following detailed description and accompanying drawings.

DETAILED DESCRIPTION

Figure 1:
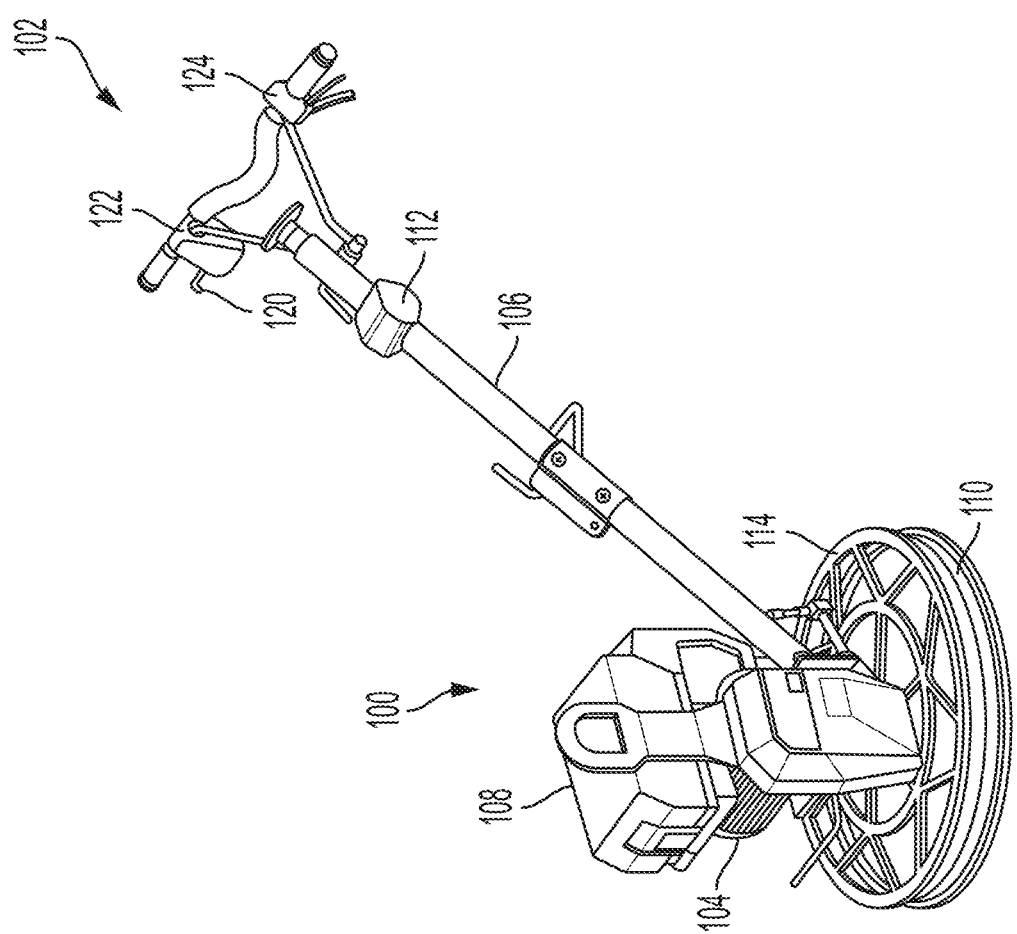
FIG. 1 illustrates a perspective view of a power trowel in accordance with embodiments described herein.

FIG. 1 illustrates an example of a battery pack powered or power trowel 100, according to some embodiments. The power trowel 100 includes a handle 102 and a housing 104 coupled via a shaft 106. The housing 104 houses a motor 780 and a controller 700 (shown in FIG. 7) configured to control operation of the power trowel 100. A blade assembly 110 is coupled to the housing 104 and is driven by the motor 780. A blade housing 114 surrounds the blade assembly 110 to protect an operator or bystander from movement of the blade assembly 110.

The motor 780 may receive power from a battery pack 108 coupled to the power trowel 100. For example, the battery pack 108 provides direct current ("DC") power to the motor 780. However, the power trowel 100 may be configured to be operated by other types of power, such as, but not limited to, alternating-current ("AC") power from an AC power source. In some embodiments, the power trowel 100 includes a power cable (e.g., a power cord). In other embodiments, the motor 780 is a gas-powered engine, and other electrical components of the power trowel 100 receive power, directly or indirectly, from AC or DC power generated by the gas-powered engine.

Figure 2:
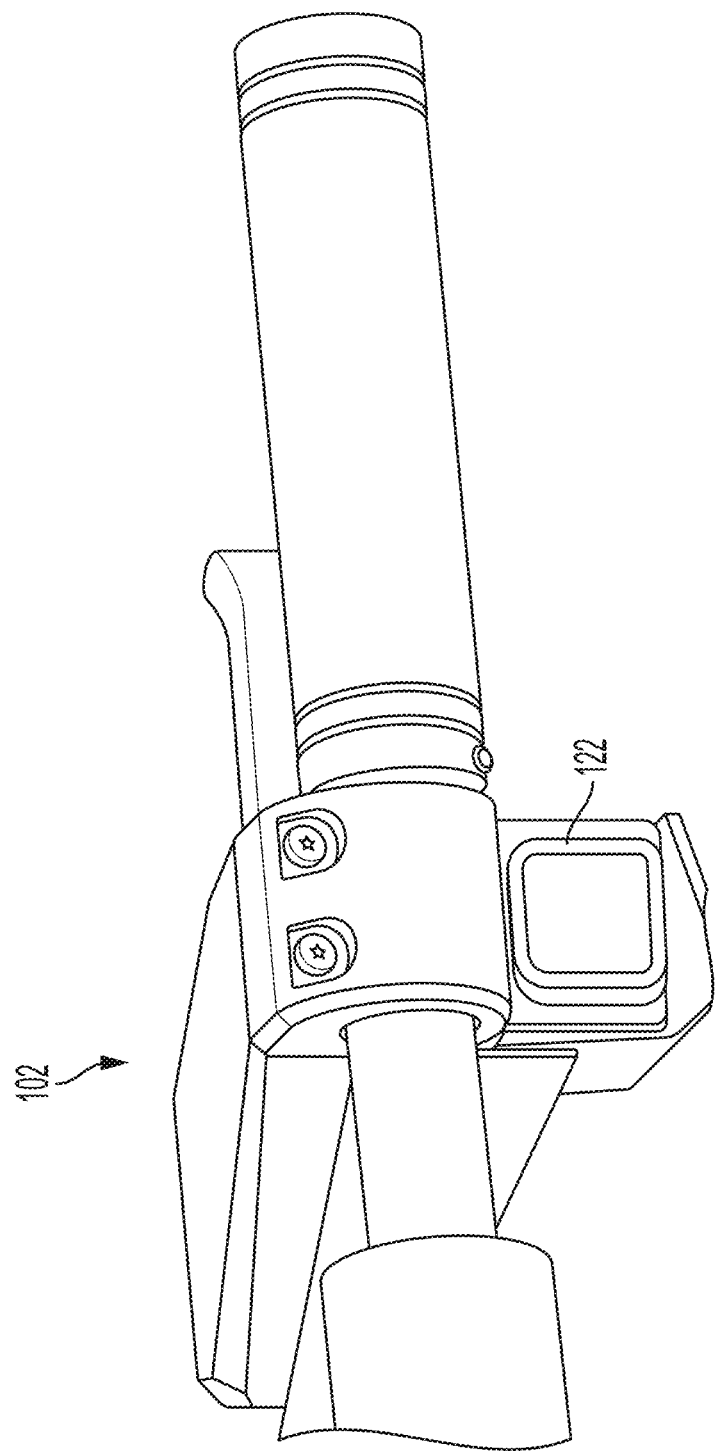
FIG. 2 illustrates a power switch of the power trowel of FIG. 1 in accordance with embodiments described herein.

The handle 102 includes a power switch 122, a speed control input or speed control lever 120, and a grip switch 124. In some embodiments, the grip switch 124 is absent or not included on the power trowel 100. FIG. 2 illustrates the power switch 122 according to one example. In the example of FIG. 2, the power switch 122 is configured as a rocker switch configured to rock or pivot between two positions. When in a first position (e.g., an ON position), the power switch 122 provides a signal to the controller 700 to turn on the power trowel 100, thereby providing power to the motor 780 according to the speed control lever 120. When in a second position (e.g., an OFF position), the power switch 122 provides a signal to the controller 700 to turn off the power trowel 100, thereby stopping power from being provided to the motor 780. In some embodiments, when the power switch 122 is turned off, the controller 700 ignores actuation of the speed control lever 120. While illustrated as a rocker switch, the power switch 122 may instead be another type of input device, such as one or more buttons, a sliding switch, or another suitable input device.

Figure 3A:
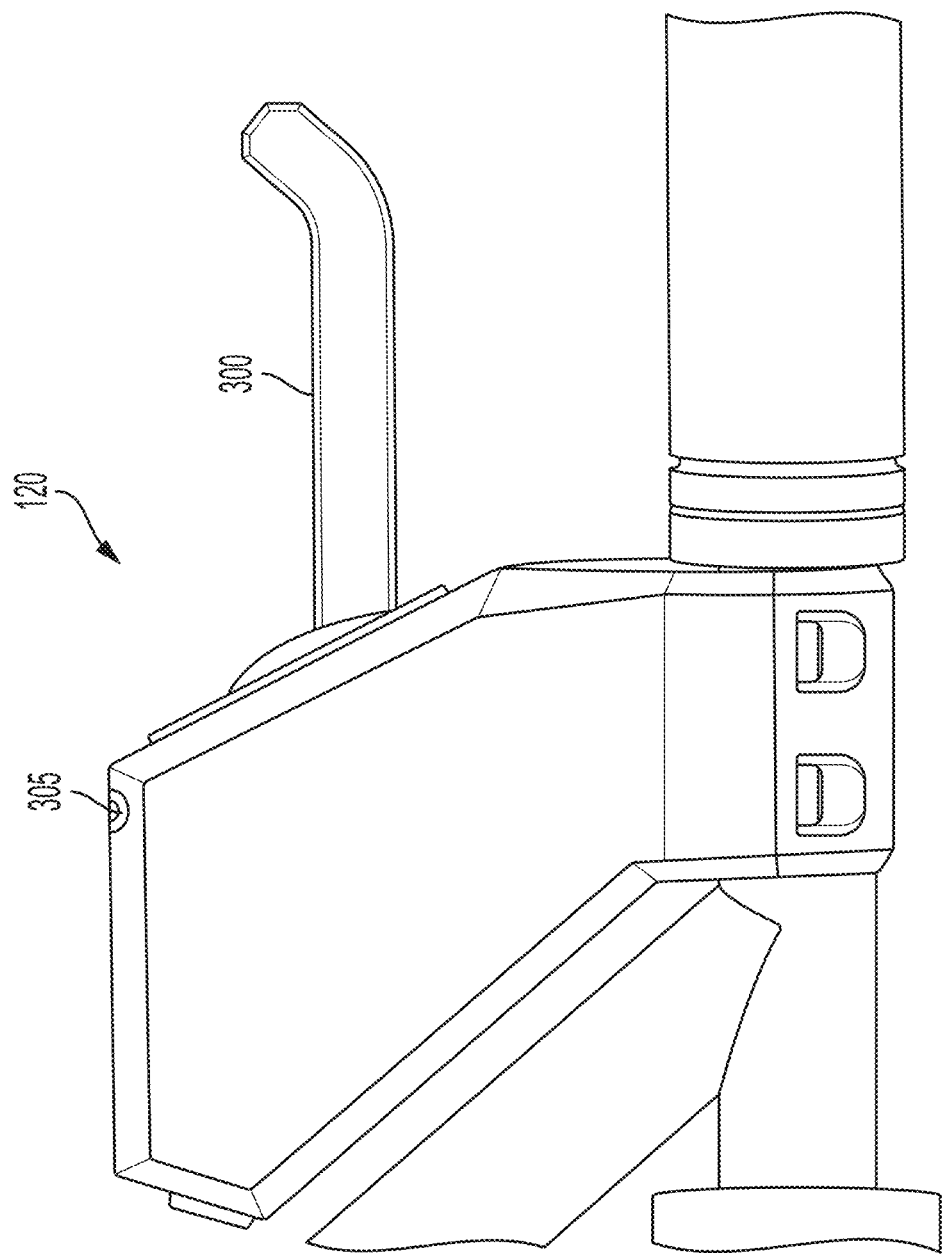
FIG. 3A illustrates a side view of a speed control input for the power trowel of FIG. 1 in accordance with embodiments described herein.
Figure 3B:
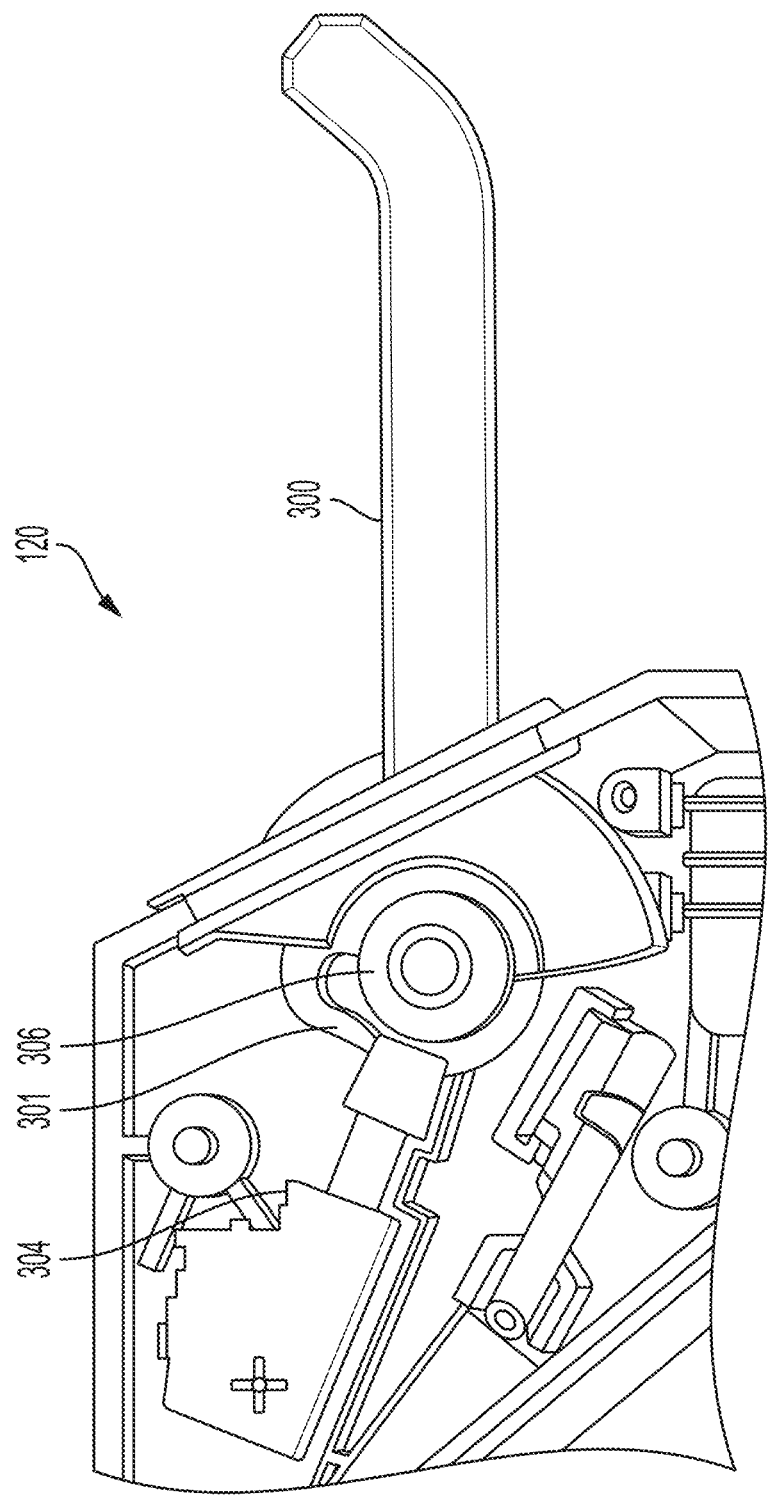
FIG. 3B illustrates the side view of the speed control input of FIG. 3A with a housing portion removed.
Figure 3C:
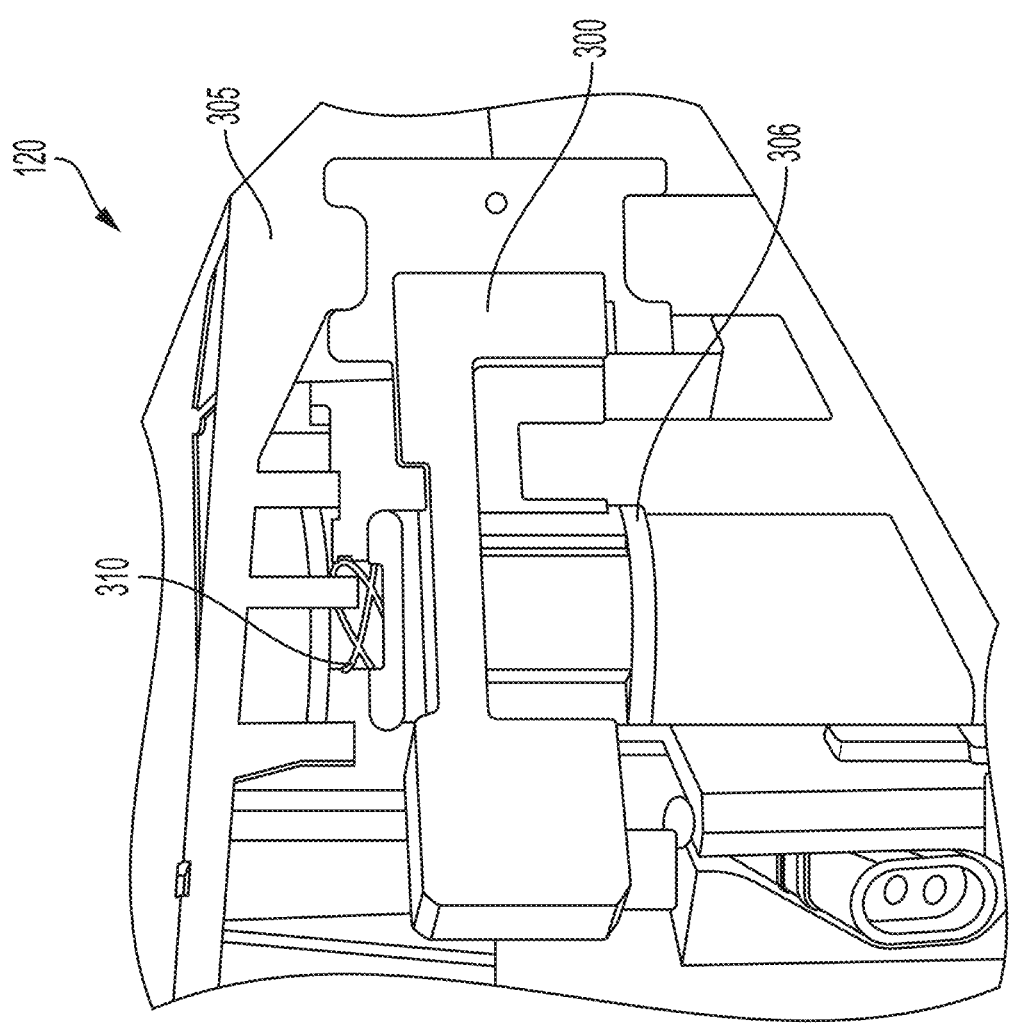
FIG. 3C illustrates a top view of the speed control input of FIG. 3A with a housing portion removed.

FIGS. 3A-3C illustrate the speed control lever 120 (e.g., a trigger) according to one example. In the example of FIG. 3A, the speed control lever 120 (shown in a side view) includes a lever portion 300 protruding from a housing portion 305. FIG. 3B illustrates the speed control lever 120 with the housing portion 305 removed. FIG. 3C illustrates the speed control lever 120 from a top view. When the lever portion 300 is actuated, a first end 301 of the lever portion 300 contacts and translates a plunger switch 304 (e.g., a throttle switch 304). Movement of the plunger switch 304 is proportional to an actuation of the lever portion 300 such that, the farther the lever portion 300 is actuated, the farther the plunger switch 304 is actuated. A speed of the motor 780 is set based on the distance of actuation of the plunger switch 304. Accordingly, the farther the lever portion 300 is actuated, the higher the speed of the motor 780. The position of the speed control lever 120 is maintained via a compression spring 310 (e.g., a wave compression spring) held in place by the housing portion 305. In some embodiments, the speed control lever 120 includes one or more washers 306 to assist with rotation of the lever portion 300.

Figure 4A:
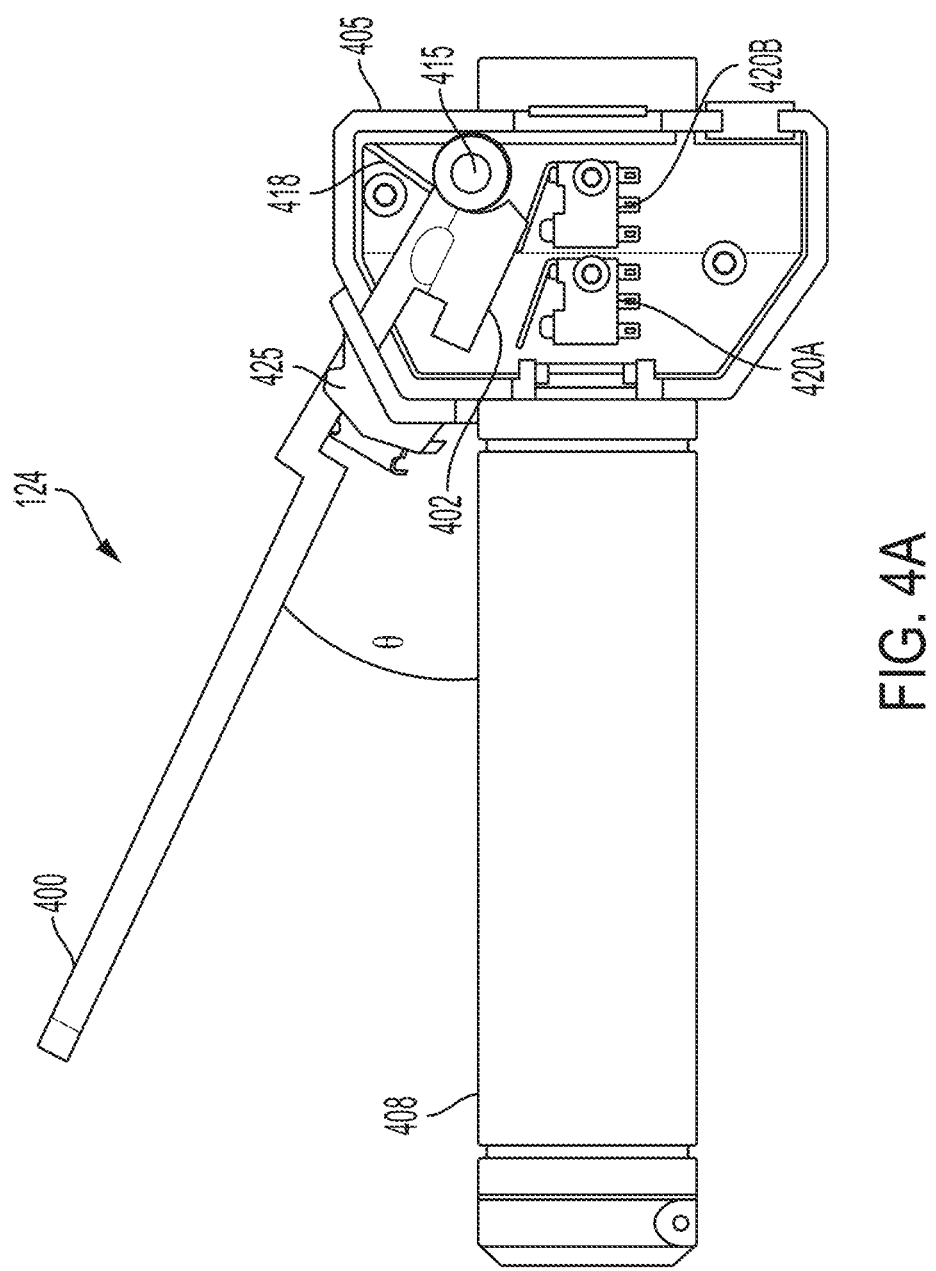
FIGS. 4A-4B illustrate a side view of a grip switch for the power trowel of FIG. 1 in accordance with embodiments described herein.
Figure 4B:
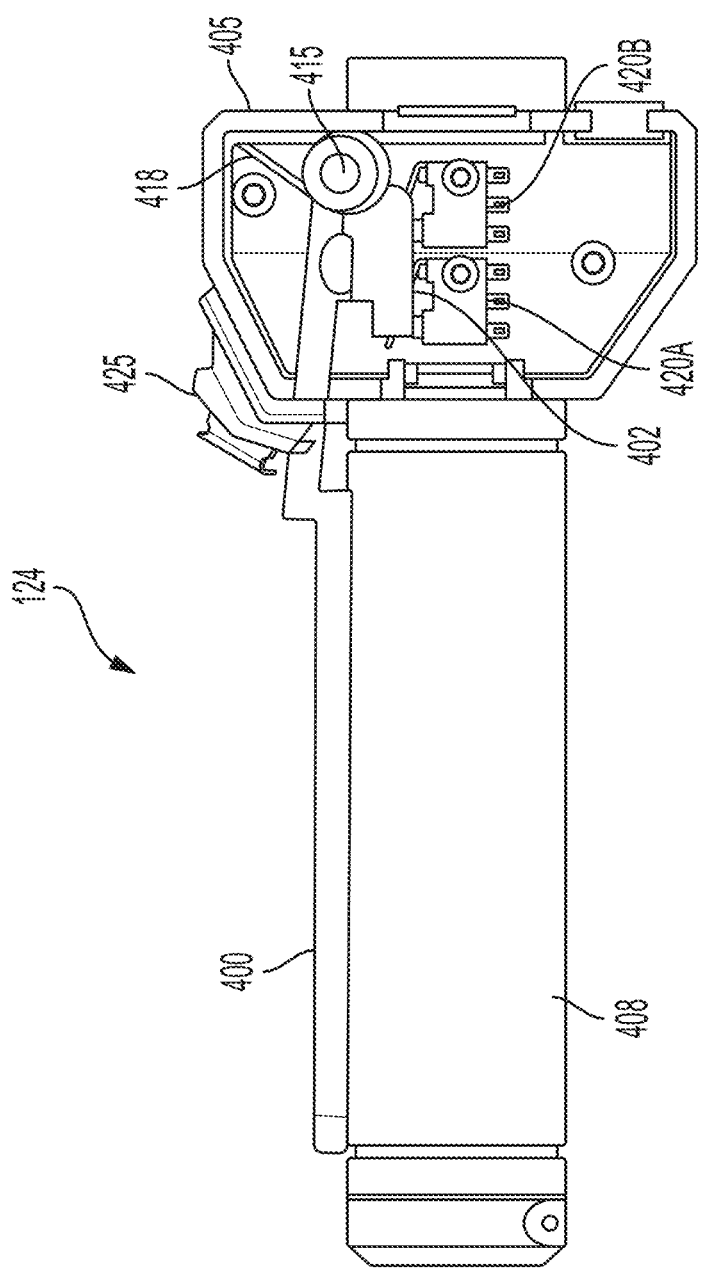

FIGS. 4A-4B illustrate the grip switch 124 according to one example. In the example of FIGS. 4A-4B, the grip switch 124 (shown in a side view) includes a lever portion 400 protruding from housing portion 405. FIG. 4A illustrates the lever portion 400 at a released position (e.g., a first position). When in the released position, the lever portion 400 is separated from a grip portion 408 by an angle ⊖. In some embodiments, the angle ⊖ is between approximately 10° and 60°. In some embodiments, the angle ⊖ is approximately 25°. The angle ⊖ may be set based on a grommet 425 such that, when the lever portion 400 is at the released position, the lever portion 400 rests on (e.g., contacts) the grommet 425. FIG. 4B illustrates the lever portion 400 at an actuated position (e.g., a second position). When the lever portion 400 is actuated, the lever portion 400 is actuated towards a grip portion 408. In some embodiments, the lever portion 400 contacts the grip portion 408 when the lever portion 400 is fully actuated.

In some embodiments, the housing portion 405 includes a pin 415 configured to secure a first end of the lever portion 400 within the housing portion 405. A torsion spring 418 is connected to the lever portion 400. When the lever portion 400 is actuated, the torsion spring 418 provides a resistive force to the lever portion 400 such that, when the lever portion 400 is released, the lever portion 400 returns to the released position from the actuated position. In some embodiments, the torsion spring 418 has a preload angle of approximately 35° and a total movement range of approximately 60°. The torsion spring 418 may be formed of a wire having an outer diameter ranging between approximately 1.0 mm and 2.0 mm (for example, 1.5 mm).

The housing portion 405 also includes a first switch 420A and a second switch 420B (collectively forming a switch pair 420). When the lever portion 400 is in the released position (as shown in FIG. 4A), the first switch 420A and the second switch 420B are in an open position. When the lever portion 400 is in the actuated position (as shown in FIG. 4B), a contact portion 402 of the lever portion 400 contacts the first switch 420A and the second switch 420B, placing them in a closed position. The first switch 420A and the second switch 420B are communicatively connected to the controller 700 and provide signals indicating whether the lever portion 400 is actuated.

Figure 5:
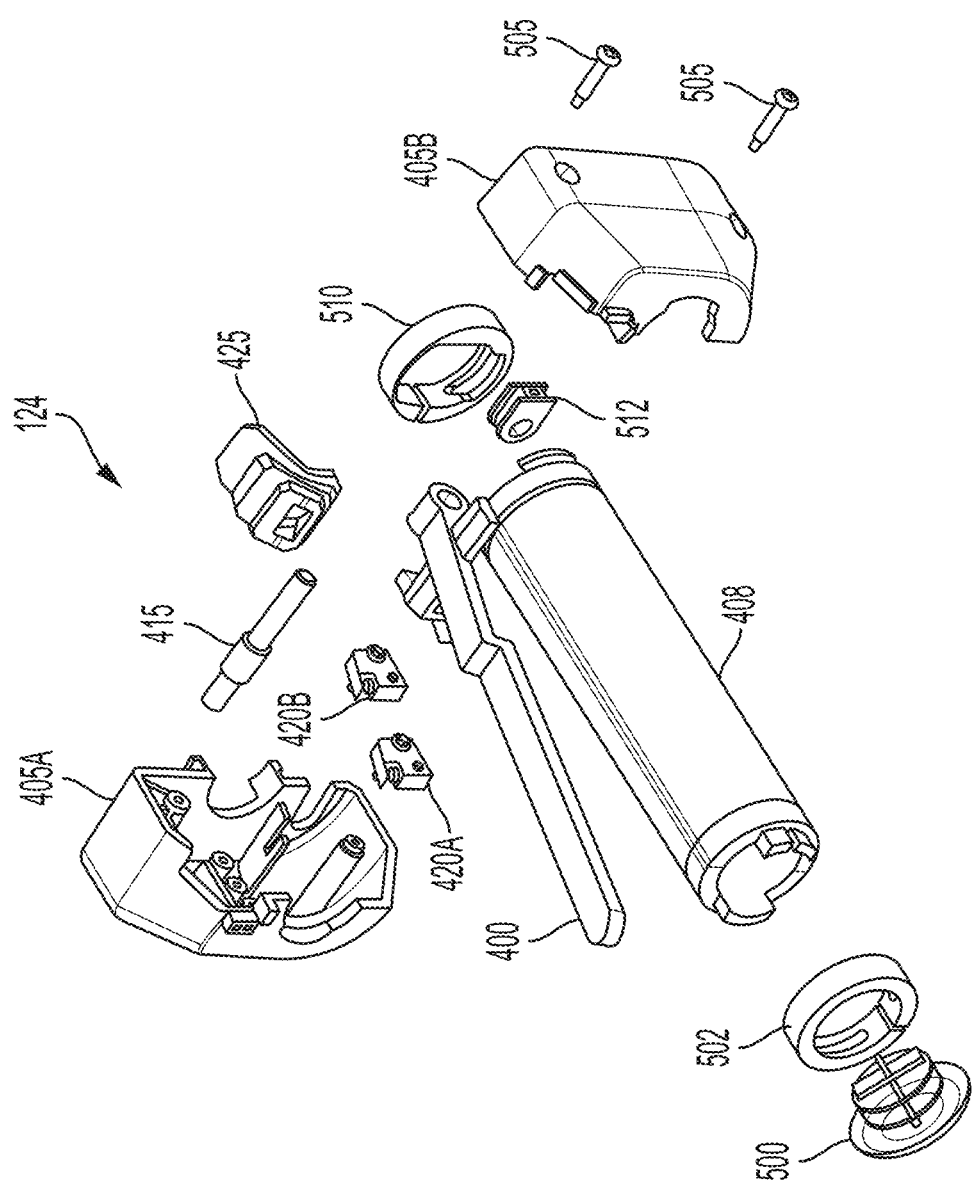
FIG. 5 provides an exploded view of the grip switch of FIGS. 4A-4B.

FIG. 5 provides an exploded view of the grip switch 124 shown in the examples of FIGS. 4A-4B. The grip switch 124 includes a plug 500 secured to a first end of the grip portion 408 by a clamp 502. Additionally, the housing portion 405 is formed by securing a first housing portion 405A and a second housing portion 405B together via one or more fasteners 505. A second end of the grip portion 408 is secured to the shaft 106 via a clamp 510 and a grommet 512.

Figure 6A:
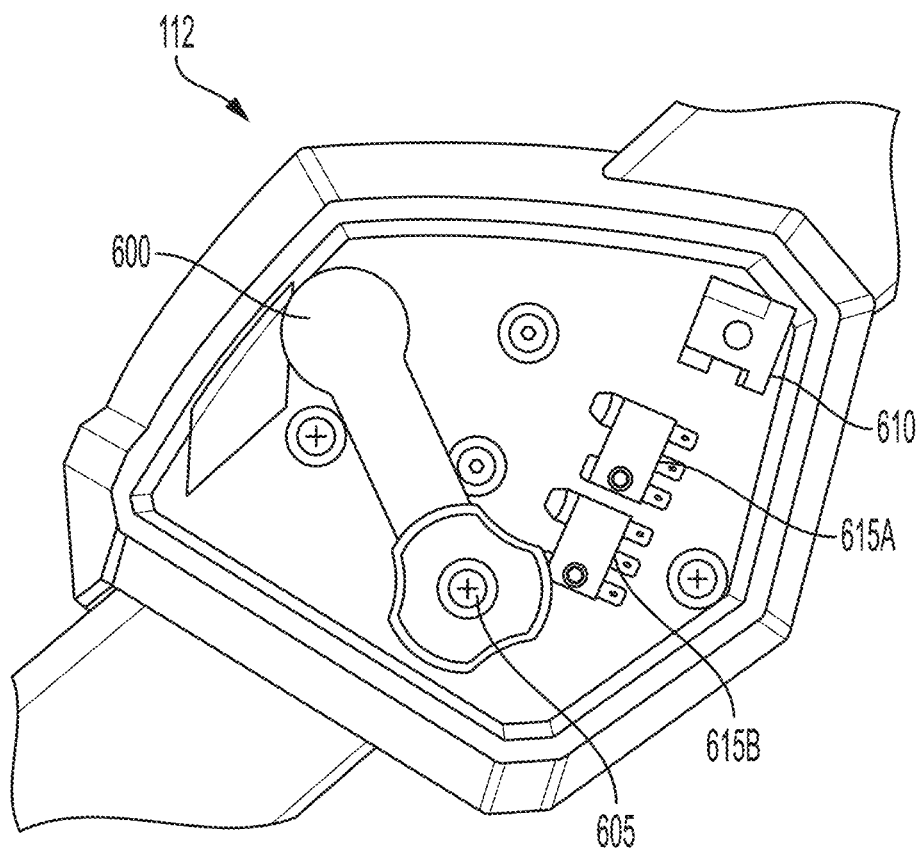
FIGS. 6A-6B illustrate a safety switch of the power trowel of FIG. 1 in accordance with embodiments described herein.

Returning to FIG. 1, a safety switch 112 is situated on the shaft 106. The safety switch 112, an example of which is shown in FIG. 6A, includes a safety lever 600 that pivots around a pivot point 605. In the example of FIG. 6A, the safety switch 112 includes a retaining portion 610, a first detecting sensor 615A and a second detecting sensor 615B. While two detecting sensors 615A, 615B are illustrated, in some embodiments, the safety switch 112 includes fewer or more detecting sensors to sense a position of the safety lever 600.

Figure 6B:
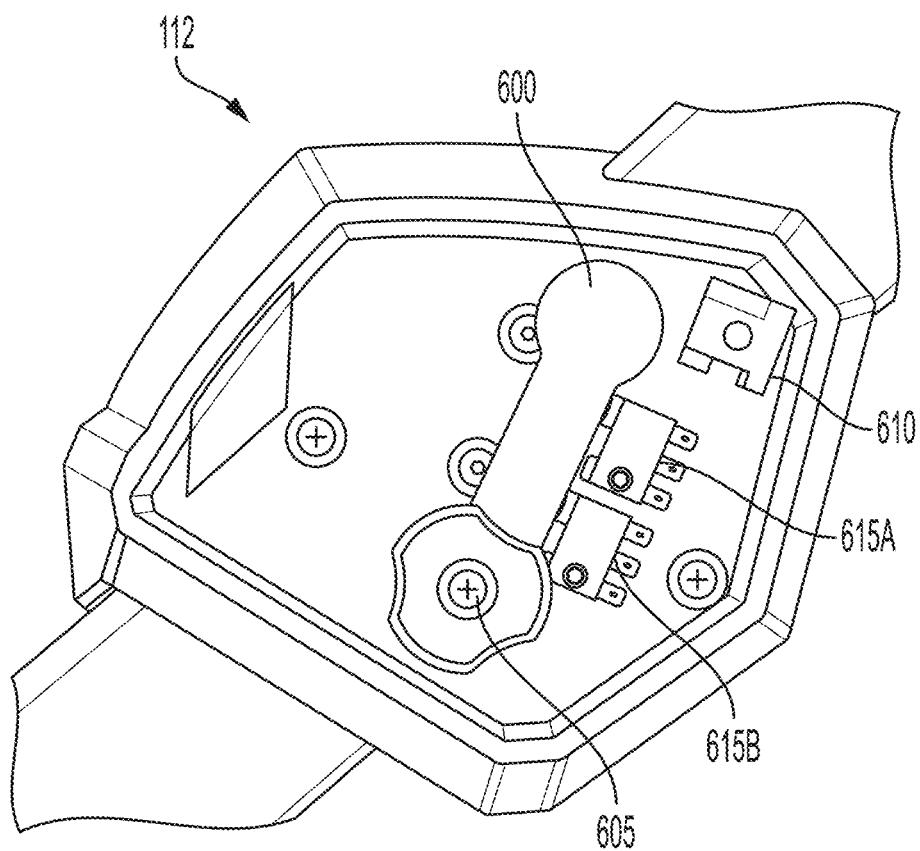

In FIG. 6A, the safety lever 600 is at a first position or a disengaged position. When in the disengaged position, the power trowel 100 operates the motor 780 according to the power switch 122 and the speed control lever 120. However, should the power trowel 100 begin to spin rapidly or be generally uncontrolled, rotational forces cause movement of the safety lever 600 such that the safety lever 600 pivots about the pivot point 605 to a second position or an engaged position, as illustrated in FIG. 6B.

When in the second position, the safety lever 600 contacts the first and second detecting sensors 615A, 615B. The detecting sensors 615A, 615B provide a signal to the controller 700 indicative of the position of the safety lever 600. Accordingly, when the safety lever 600 contacts the first and second detecting sensors 615A, 615B, the detecting sensors 615A, 615B provide a signal to the controller 700 indicating that the safety lever 600 is engaged. The retaining portion 610 maintains the safety lever 600 in the second position until reset by an operator of the power trowel 100. The retaining portion 610 may be, for example, a magnet configured to magnetically attract the safety lever 600, a retaining clip configured to hold the safety lever 600, or the like.

In the illustrated example, the detecting sensors 615A, 615B are configured as microswitches that output a signal to the controller 700 when contacted by the safety lever 600. However, in other embodiments, the detecting sensors 615A, 615B are another type of sensor. For example, the detecting sensors 615A, 615B may be position sensors configured to measure a distance between the safety lever 600 and the detecting sensors 615A, 615B. Signals provided by the detecting sensors 615A, 615B to the controller 700 indicate the distance between the safety lever 600 and the detecting sensors 615A, 615B. Accordingly, the controller 700 may determine whether the safety lever 600 is in a first, disengaged position or a second, engaged position based on signals from the detecting sensors 615A, 615B.

In the illustrated embodiment of FIG. 1, the power trowel 100 includes both the grip switch 124 and the safety switch 112. However, in other embodiments, the power trowel 100 may include only one of the grip switch 124 and the safety switch 112. For example, when a power trowel 100 includes only the safety switch 112, the power trowel 100 performs only the method 800 (see FIG. 8). When a power trowel 100 includes only the grip switch 124, the power trowel 100 performs only the method 900 (see FIG. 9). A power trowel 100 including both the grip switch 124 and the safety switch 112 may perform both the method 800 and the method 900.

Figure 7:
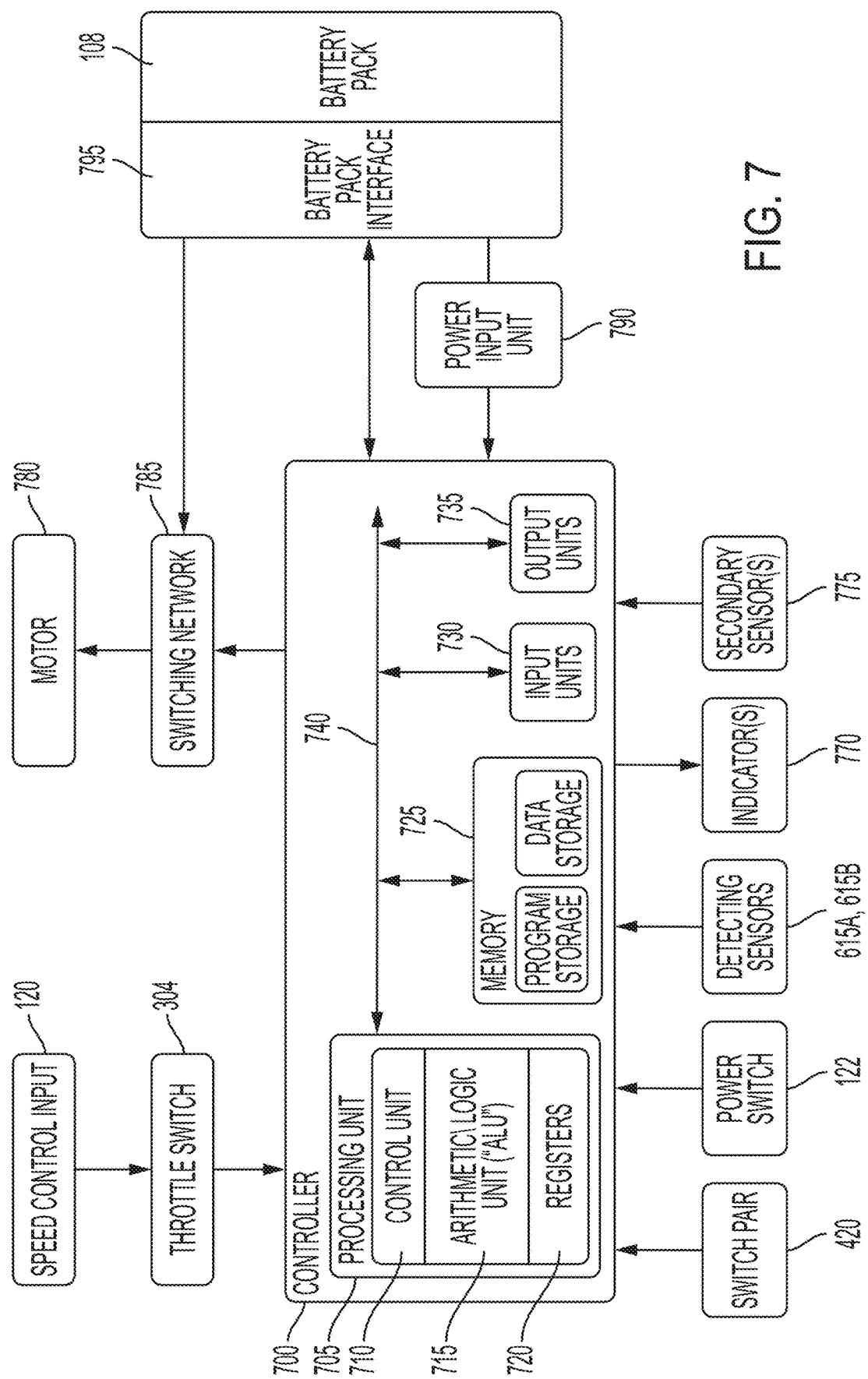
FIG. 7 illustrates a block diagram of a controller for the power trowel of FIG. 1 in accordance with embodiments described herein.

In some embodiments, wires are routed within the handle 102 and shaft 106 to electrically couple the speed control lever 120, the power switch 122, the grip switch 124, and the safety switch 112 to a controller 700 (see FIG. 7). In other embodiments, the wires are located external to the handle 102 and the shaft 106.

A controller 700 for the power trowel 100 is illustrated in FIG. 7. The controller 700 is electrically and/or communicatively connected to a variety of modules or components of the power trowel 100. For example, the illustrated controller 700 is connected to the speed control lever 120 (via the throttle switch 304), the power switch 122, the switch pair 420, the detecting sensors 615A, 615B, indicators 770, secondary sensors 775, the motor 780 (via the power switching network 785), power input unit 790, and a battery pack interface 795. The battery pack 108 is connected to the battery pack interface 795 for mechanically and electrically connecting the battery pack 108 to the power trowel 100.

The controller 700 includes a plurality of electrical and electronic components that provide power, operational control, and protection to the components and modules within the controller 700 and/or power trowel 100. For example, the controller 700 includes, among other things, a processing unit 705 (e.g., a microprocessor, an electronic processor, an electronic controller, a microcontroller, or another suitable programmable device), a memory 725, input units 730, and output units 735. The processing unit 705 includes, among other things, a control unit 710, an arithmetic logic unit ("ALU") 715, and a plurality of registers 720 (shown as a group of registers in FIG. 7), and is implemented using a known computer architecture (e.g., a modified Harvard architecture, a von Neumann architecture, etc.). The processing unit 705, the memory 725, the input units 730, and the output units 735, as well as the various modules connected to the controller 700 are connected by one or more control and/or data buses (e.g., common bus 740). The control and/or data buses are shown generally in FIG. 7 for illustrative purposes. The use of one or more control and/or data buses for the interconnection between and communication among the various modules and components would be known to a person skilled in the art in view of the embodiments described herein.

The memory 725 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 705 is connected to the memory 725 and executes software instructions that are capable of being stored in a RAM of the memory 725 (e.g., during execution), a ROM of the memory 725 (e.g., on a generally permanent basis), or another non-transitory computer readable medium such as another memory or a disc. Software included in the implementation of the power trowel 100 can be stored in the memory 725 of the controller 700. The software includes, for example, firmware, one or more applications, program data, filters, rules, one or more program modules, and other executable instructions. The controller 700 is configured to retrieve from the memory 725 and execute, among other things, instructions related to the control processes and methods described herein. In other embodiments, the controller 700 includes additional, fewer, or different components.

The controller 700 drives the motor 780 to rotate the blade assembly 110 in response to a user's actuation of the speed control lever 120. The blade assembly 110 may be coupled to the motor 780 via an output shaft. In other embodiments, the blade assembly 110 is coupled to the motor 780 via a gearbox. Movement of the speed control lever 120 (and, more specifically, the lever portion 300) actuates the throttle switch 304, which outputs a signal to the controller 700 to drive the motor 780, and therefore the blade assembly 110. In some instances, the controller 700 only drives the motor 780 when the power switch 122 is in an ON position. In some instances, the controller 700 only drives the motor 780 when the first switch 420A and the second switch 420B are both closed by the lever portion 400.

In some embodiments, the controller 700 drives the power switching network 785 (e.g., a FET switching bridge) to drive the motor 780. For example, the power switching network 785 may include a plurality of high side switching elements (e.g., FETs) and a plurality of low side switching elements. The controller 700 may control each FET of the plurality of high side switching elements and the plurality of low side switching elements to drive each phase of the motor 780. When the speed control lever 120 is released, or when a distance of actuation of the speed control lever 120 is reduced, the controller 700 may apply a braking force to the motor 780. For example, the power switching network 785 may be controlled to more quickly deaccelerate the motor 780.

The indicators 770 are also connected to the controller 700 and receive control signals from the controller 700 to turn on and off or otherwise convey information based on different states of the power trowel 100. The indicators 770 include, for example, one or more light-emitting diodes ("LEDs"), or a display screen. The indicators 770 can be configured to display conditions of, or information associated with, the power trowel 100. For example, the indicators 770 can display information relating to the operational state of the power trowel 100 or battery pack 108, such as the charge capacity of the battery pack 108. The indicators 770 may also display information relating to a fault condition, or other abnormality, of the power trowel 100. In addition to or in place of visual indicators, the indicators 770 may also include a speaker or a tactile feedback mechanism to convey information to a user through audible or tactile outputs. In some embodiments, the indicators 770 display information relating to an uncontrolled condition or state of the power trowel 100 (e.g., a bind-up condition, a kickback condition, etc.). For example, the indicators 770 may indicate whether the safety switch 112 is engaged or disengaged based on signals from the detecting sensors 615A, 615B.

Figure 8:
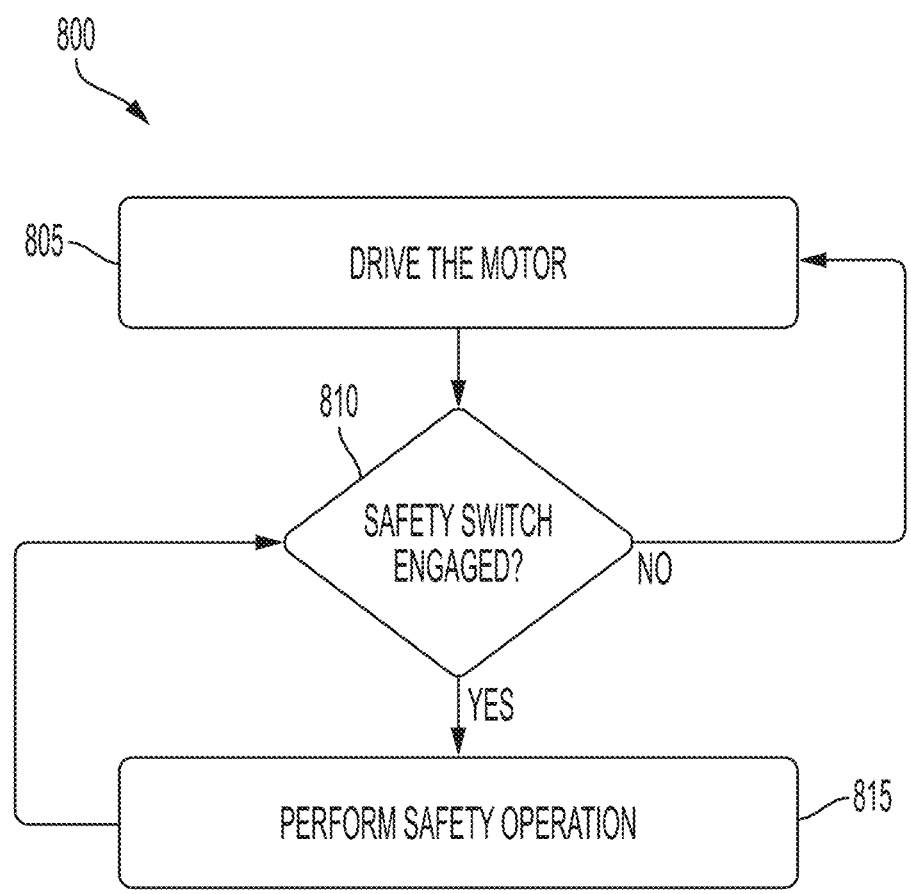
FIG. 8 illustrates a process executed by the controller of FIG. 7 in accordance with embodiments described herein.

FIG. 8 is a flowchart of an example method 800 for controlling the power trowel 100 based on a position of the safety switch 112. The method 800 may be performed by the controller 700. At block 805, the controller 700 operates, in response to actuation of the speed control lever 120, the motor 780 to drive the blade assembly 110. For example, a user of the power trowel 100 pivots the power switch 122 to an ON position. The user of the power trowel 100 then actuates the lever portion 300 of the speed control lever 120. Upon detecting actuation of the lever portion 300 via the throttle switch 304, the controller 700 controls the power switching network 785 to supply power to the motor 780. In some instances, the controller 700 continues to adjust an amount of power supplied to the motor 780 based on an amount of actuation of the lever portion 300.

At block 810, the controller 700 determines whether the safety switch 112 is in an engaged position. When the safety switch 112 is not in an engaged position, the safety lever 600 is not engaged with the detecting sensors 615A, 615B. The detecting sensors 615A, 615B transmit signals to the controller 700 indicative of the safety lever 600 not contacting the detecting sensors 615A, 615B. When the controller 700 determines that the safety switch 112 is not in an engaged position, the controller 700 returns to block 805 and continues to operate the motor 780. In some instances, the controller 700 determines that the power trowel 100 is in a controlled state when the safety switch 112 is not in an engaged position.

When the safety switch 112 is in an engaged position, the safety lever 600 is engaged with the detecting sensors 615A, 615B. The detecting sensors 615A, 615B transmit signals to the controller 700 indicative of the safety lever 600 contacting the detecting sensors 615A, 615B. When the controller 700 determines that the safety switch 112 is in an engaged position, the controller 700 proceeds to block 815. In some instances, the controller 700 determines that the power trowel 100 is in an uncontrolled state when the safety switch 112 is engaged.

At block 815, the controller 700 performs a safety operation. For example, in some embodiments, the controller 700 stops providing power from the battery pack 108 to the motor 780. In some embodiments, the controller 700 brakes the motor 780 to a stop. In further embodiments, the controller 700 electrically disconnects the battery pack 108 from the motor 780. Once the motor 780 is stopped, the controller 700 may lock operation of the power trowel 100 such that, while the safety switch 112 is in the engaged position, an operator cannot operate the power trowel 100. While operation of the power trowel 100 is locked, the controller 700 may ignore actuation of the speed control lever 120.

While performing the safety operation, the controller 700 continues to monitor the position of the safety switch 112. Accordingly, as long as the safety switch 112 is in the engaged position, the controller 700 continues to perform the safety operation. Accordingly, in an instance where the controller 700 locks operation of the power trowel 100, the controller 700 maintains locked operation while the safety switch 112 is in the engaged position. Once the safety switch 112 is moved to the un-engaged position, the controller 700 permits operation of the power trowel 100. Accordingly, implementation of the method 800 may assist an operator of the power trowel 100 in regaining control of the power trowel 100 when the controller 700 determines the power trowel is in an uncontrolled state.

Figure 9:
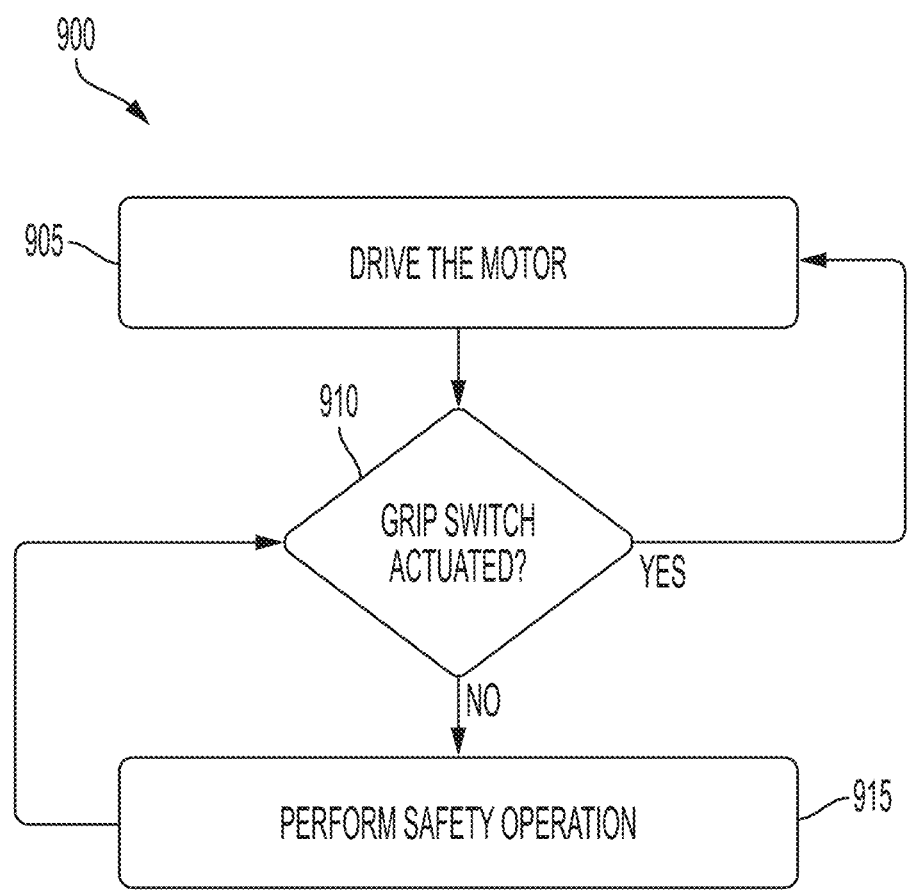
FIG. 9 illustrates another process executed by the controller of FIG. 7 in accordance with embodiments described herein.

FIG. 9 is a flowchart of an example method 900 for controlling the power trowel 100 based on a position of the grip switch 124. The method 900 may be performed by the controller 700. The method 900 may be performed concurrently with, or in replacement of, the method 800. At block 905, the controller 700 operates, in response to actuation of the speed control lever 120 and actuation of the grip switch 124, the motor 780 to drive the blade assembly 110. For example, a user of the power trowel 100 pivots the power switch 122 to an ON position. The user of the power trowel 100 actuates the lever portion 400 of the grip switch 124, thereby actuating the switch pair 420. The user of the power trowel 100 then actuates the lever portion 300 of the speed control lever 120. Upon detecting actuation of the lever portion 300 via the throttle switch 304 and detecting actuation of the switch pair 420, the controller 700 controls the power switching network 785 to supply power to the motor 780. In some instances, the controller 700 continues to adjust an amount of power supplied to the motor 780 based on an amount of actuation of the lever portion 300.

At block 910, the controller 700 determines whether the grip switch 124 continues to be engaged. When the controller 700 determines that the lever portion 400 is in an actuated position, the controller 700 returns to block 905 and continues to operate the motor 780. In some instances, the controller 700 determines that the power trowel 100 is in a controlled state when the grip switch 124 is in an actuated position. When the lever portion 400 is not in an actuated position, the contact portion 402 is not engaged with the switch pair 420. The switch pair 420 transmits signals to the controller 700 indicative of the contact portion 402 not contacting the switch pair 420. In some embodiments, a lack of signals from the switch pair 420 indicates that the contact portion 402 is not contacting the switch pair 420. When the controller 700 determines that the grip switch 124 is not in an actuated position (e.g., is in a released position), the controller 700 proceeds to block 915. In some instances, the controller 700 determines that the power trowel 100 is in an uncontrolled state when the grip switch 124 is released.

At block 915, the controller 700 performs a safety operation. For example, in some embodiments, the controller 700 stops providing power from the battery pack 108 to the motor 780. In some embodiments, the controller 700 brakes the motor 780 to a stop. In some embodiments, the controller 700 electrically disconnects the battery pack 108 from the motor 780. Implementation of the method 900 may assist an operator of the power trowel 100 in regaining control of the power trowel 100 when, for example, the controller 700 determines the power trowel is in an uncontrolled state.

Representative Features

Representative features are set out in the following clauses, which stand alone or may be combined, in any combination, with one or more features disclosed in the text and/or drawings of the specification.

1. A power trowel comprising:
   a handle including a speed control input;
   a housing;
   a shaft connecting the handle and the housing;
   a safety mechanism located on the shaft, the safety mechanism including a safety lever configured to move in response to an uncontrolled condition of the power trowel;
   a blade assembly positioned below the housing;
   a motor located within the housing and coupled to the blade assembly;
   a controller connected to the motor and the safety mechanism, the controller configured to:
      drive, in response to actuation of the speed control input, the motor,
      detect a movement of the safety lever from a first position to a second position, and
      perform, in response to the movement of the safety lever to the second position, a safety operation.
2. The power trowel of clause 1, wherein the controller is located within the housing.
3. The power trowel of any preceding clause, wherein the safety mechanism further includes a position sensor configured to detect a position of the safety lever.
4. The power trowel of clause 3, wherein the controller is configured to detect the movement of the safety lever based on a signal from the position sensor.
5. The power trowel of any preceding clause, further comprising:
   a power switch located on the handle, and wherein the controller is configured to:
      drive, in response to actuation of the speed control input, the motor when the
      power switch is in a first power switch position, and ignore actuation of the speed control input when the power switch is in a second power switch position.
6. The power trowel of any preceding clause, wherein an amount of power provided to the motor to drive the motor is based on an amount of actuation of the speed control input.
7. The power trowel of any preceding clause, wherein the speed control input includes a lever portion configured to actuate a plunger switch.
8. The power trowel of any preceding clause, further comprising:
   a battery pack interface configured to receive a battery pack, the battery pack interface configured to provide power to the motor, and
   wherein the controller is configured to perform the safety operation by disconnecting the battery pack from the motor.
9. The power trowel of any preceding clause, wherein the controller is configured to perform the safety operation by braking the motor.
10. The power trowel of any preceding clause, wherein the controller is further configured to:
    detect a second movement of the safety lever from the second position to the first position; and
    stop, in response to the safety lever being in the first position, performing the safety operation.
11. A power trowel comprising:
    a handle including a speed control input;
    a housing;
    a shaft connecting the handle and the housing;
    a blade assembly positioned below the housing;
    a motor located within the housing and coupled to the blade assembly; and
    a safety mechanism located on the shaft, the safety mechanism including:
       a safety lever configured to move from a first position to a second position in response to an uncontrolled condition of the power trowel,
       a sensor configured to sense whether the safety lever is in the first position or the second position, and
       a retaining portion configured to retain the safety lever in the second position.
12. The power trowel of clause 11, wherein the speed control input includes a lever portion configured to actuate a switch.
13. The power trowel of clause 12, wherein the speed control input includes a compression spring configured to maintain a position of the lever portion.
14. The power trowel of any of clauses 11-13, further comprising:
    a battery pack interface configured to receive a battery pack, and
    wherein the battery pack interface is configured to provide power to the motor.
15. A power trowel comprising:
    a handle;
    a housing;
    a shaft connecting the handle and the housing;
    a safety mechanism located on the shaft, the safety mechanism including a safety lever configured to move in response to an uncontrolled condition of the power trowel;
    a motor located within the housing; and
    a controller connected to the motor and the safety mechanism, the controller configured to:
       detect a first movement of the safety lever from a first position to a second position,
       lock, in response to the first movement of the safety lever to the second position, operation of the motor,
       detect a second movement of the safety lever from the second position to the first position, and
       permit, in response to the second movement of the safety lever to the first position, operation of the motor.
16. The power trowel of clause 15, wherein the safety mechanism further includes a position sensor configured to detect a position of the safety lever.
17. The power trowel of clause 16, wherein the position sensor includes a microswitch configured to provide an output to the controller in response to the safety lever contacting the microswitch.

18. The power trowel of any of clauses 15-17, wherein the safety mechanism further includes a retaining portion configured to retain the safety lever in the second position.

19. The power trowel of clause 18, wherein the retaining portion includes a magnet configured to magnetically attract the safety lever.

20. The power trowel of any of clauses 15-19, further comprising:
a battery pack interface configured to receive a battery pack, the battery pack interface configured to provide power to the motor, and
wherein the controller is further configured to lock operation of the motor by disconnecting the battery pack from the motor.

21. A power trowel comprising:
a handle including a speed control input;
a safety mechanism located on the handle, the safety mechanism including a safety lever configured to indicate an uncontrolled condition of the power trowel;
a housing;
a shaft connecting the handle and the housing;
a blade assembly positioned below the housing;
a motor located within the housing and coupled to the blade assembly; and
a controller connected to the motor and the safety mechanism, the controller configured to:
drive, in response to actuation of the speed control input, the motor,
detect a movement of the safety lever from a first position to a second position, and
perform, in response to the movement of the safety lever to the second position, a safety operation.

22. The power trowel of clause 21, wherein:
the first position is an actuated position; and
the second position is a released position.

23. The power trowel of any of clauses 21-22, wherein the controller is further configured to drive the motor in response to actuation of both the speed control input and the safety lever.

24. The power trowel of any of clauses 21-23, wherein the safety mechanism includes a torsion spring configured to provide a resistive force to the safety lever.

25. The power trowel of any of clauses 21-24, wherein:
the safety mechanism includes at least one switch configured to be actuated by the safety lever; and
the safety lever is configured to actuate the at least one switch when the safety lever is in the first position.

Thus, embodiments provided herein describe, among other things, systems and methods for handling an uncontrolled trowel event using a safety switch. Various features and advantages are set forth in the following claims.

What is claimed is:

1. A power trowel comprising:
a handle including a speed control input;
a housing;
a shaft connecting the handle and the housing;
a safety mechanism located on the shaft, the safety mechanism including a safety lever configured to move in response to an uncontrolled condition of the power trowel;
a blade assembly positioned below the housing;
a motor located within the housing and coupled to the blade assembly;
a controller connected to the motor and the safety mechanism, the controller configured to:
drive, in response to actuation of the speed control input, the motor,
detect a movement of the safety lever from a first position to a second position, and
perform, in response to the movement of the safety lever to the second position, a safety operation.

2. The power trowel of claim 1, wherein the controller is located within the housing.

3. The power trowel of claim 1, wherein the safety mechanism further includes a position sensor configured to detect a position of the safety lever.

4. The power trowel of claim 3, wherein the controller is configured to detect the movement of the safety lever based on a signal from the position sensor.

5. The power trowel of claim 1, further comprising:
a power switch located on the handle, and wherein the controller is configured to:
drive, in response to actuation of the speed control input, the motor when the power switch is in a first power switch position, and
ignore actuation of the speed control input when the power switch is in a second power switch position.

6. The power trowel of claim 1, wherein an amount of power provided to the motor to drive the motor is based on an amount of actuation of the speed control input.

7. The power trowel of claim 1, wherein the speed control input includes a lever portion configured to actuate a plunger switch.

8. The power trowel of claim 1, further comprising:
a battery pack interface configured to receive a battery pack, the battery pack interface configured to provide power to the motor, and
wherein the controller is configured to perform the safety operation by disconnecting the battery pack from the motor.

9. The power trowel of claim 1, wherein the controller is configured to perform the safety operation by braking the motor.

10. The power trowel of claim 1, wherein the controller is further configured to:
detect a second movement of the safety lever from the second position to the first position; and
stop, in response to the safety lever being in the first position, performing the safety operation.

11. A power trowel comprising:
a handle including a speed control input;
a housing;
a shaft connecting the handle and the housing;
a blade assembly positioned below the housing;
a motor located within the housing and coupled to the blade assembly; and
a safety mechanism located on the shaft, the safety mechanism including:
a safety lever configured to move from a first position to a second position in response to an uncontrolled condition of the power trowel,
a sensor configured to sense whether the safety lever is in the first position or the second position, and
a retaining portion configured to retain the safety lever in the second position.

12. The power trowel of claim 11, wherein the speed control input includes a lever portion configured to actuate a switch.

13. The power trowel of claim 12, wherein the speed control input includes a compression spring configured to maintain a position of the lever portion.

14. The power trowel of claim 11, further comprising:
a battery pack interface configured to receive a battery pack, and wherein the battery pack interface is configured to provide power to the motor.

15. A power trowel comprising:
a handle;
a housing;
a shaft connecting the handle and the housing;
a safety mechanism located on the shaft, the safety mechanism including a safety lever configured to move in response to an uncontrolled condition of the power trowel;
a motor located within the housing; and
a controller connected to the motor and the safety mechanism, the controller configured to:
   detect a first movement of the safety lever from a first position to a second position,
   lock, in response to the first movement of the safety lever to the second position, operation of the motor,
   detect a second movement of the safety lever from the second position to the first position, and
   permit, in response to the second movement of the safety lever to the first position, operation of the motor.

16. The power trowel of claim 15, wherein the safety mechanism further includes a position sensor configured to detect a position of the safety lever.

17. The power trowel of claim 16, wherein the position sensor includes a microswitch configured to provide an output to the controller in response to the safety lever contacting the microswitch.

18. The power trowel of claim 15, wherein the safety mechanism further includes a retaining portion configured to retain the safety lever in the second position.

19. The power trowel of claim 18, wherein the retaining portion includes a magnet configured to magnetically attract the safety lever.

20. The power trowel of claim 15, further comprising:
a battery pack interface configured to receive a battery pack, the battery pack interface configured to provide power to the motor, and
wherein the controller is further configured to lock operation of the motor by disconnecting the battery pack from the motor.

* * * * *